US011996661B2

(12) United States Patent
Hoffmann et al.

(10) Patent No.: US 11,996,661 B2
(45) Date of Patent: May 28, 2024

(54) ARRANGEMENT FOR PLUG CONNECTING ELECTRICAL CONNECTIONS

(71) Applicant: Hanon Systems, Daejeon (KR)

(72) Inventors: Michael Hoffmann, Cologne (DE); Oliver Gormanns, Monchengladbach (DE); Jochen Petzke, Hennef (DE)

(73) Assignee: HANON SYSTEMS, Daejeon (KR)

( * ) Notice: Subject to any disclaimer, the term of this patent is extended or adjusted under 35 U.S.C. 154(b) by 466 days.

(21) Appl. No.: 17/310,009

(22) PCT Filed: Jan. 7, 2020

(86) PCT No.: PCT/KR2020/000229
§ 371 (c)(1),
(2) Date: Jul. 9, 2021

(87) PCT Pub. No.: WO2020/145608
PCT Pub. Date: Jul. 16, 2020

(65) Prior Publication Data
US 2022/0052496 A1    Feb. 17, 2022

(30) Foreign Application Priority Data

Jan. 11, 2019    (DE) .................... 10 2019 100 611.2
May 6, 2019    (DE) .................... 10 2019 111 691.0

(51) Int. Cl.
| H01R 13/707 | (2006.01) |
| H01R 13/04 | (2006.01) |
| H01R 13/502 | (2006.01) |
| H01R 43/00 | (2006.01) |
| H01R 43/20 | (2006.01) |
| H02K 5/22 | (2006.01) |

(52) U.S. Cl.
CPC .......... *H01R 13/707* (2013.01); *H01R 13/04* (2013.01); *H01R 13/502* (2013.01); *H01R 43/005* (2013.01); *H01R 43/20* (2013.01); *H02K 5/225* (2013.01)

(58) Field of Classification Search
CPC .... H01R 13/707; H01R 13/04; H01R 13/502; H01R 43/005; H01R 43/20; H02K 5/225
See application file for complete search history.

(56) References Cited

U.S. PATENT DOCUMENTS

| 2005/0196285 A1 | 9/2005 | Jayanth |
| 2009/0149048 A1 | 6/2009 | Pavlovic et al. |

(Continued)

FOREIGN PATENT DOCUMENTS

| CN | 1295830 C | 1/2007 |
| CN | 101453089 A | 6/2009 |

(Continued)

*Primary Examiner* — Briggitte R. Hammond
(74) *Attorney, Agent, or Firm* — Shumaker, Loop & Kendrick, LLP; James D. Miller

(57) ABSTRACT

An arrangement for plug connecting electrical connections through a housing, particularly a device for driving a compressor. The arrangement includes a first plug connection having first plug connectors and a second plug connection having second plug connectors for transmitting electrical energy in independent transmitting ranges and a receiving element for receiving plug connectors. The receiving element having first plug connectors of the first plug connection and second plug connectors of the second plug connection is thereby implemented as an integral and cohesive unit and one-piece component.

25 Claims, 4 Drawing Sheets

(56) References Cited

U.S. PATENT DOCUMENTS

| | | | |
|---|---|---|---|
| 2010/0029110 | A1 | 2/2010 | Kiryu et al. |
| 2011/0076162 | A1 | 3/2011 | Heidecker et al. |
| 2015/0093921 | A1 | 4/2015 | Lewin |

FOREIGN PATENT DOCUMENTS

| | | | |
|---|---|---|---|
| CN | 101713397 | A | 5/2010 |
| CN | 101997239 | A | 3/2011 |
| CN | 102771016 | A | 11/2012 |
| CN | 103227396 | A | 7/2013 |
| EP | 2621029 | A1 | 7/2013 |
| JP | 2011044327 | A | 3/2011 |
| JP | 2011144788 | A | 7/2011 |
| JP | 2012174505 | A | 9/2012 |
| JP | 5951406 | B2 | 7/2016 |
| KR | 101745729 | B1 | 6/2017 |
| KR | 20170003870 | U | 11/2017 |
| WO | 2011101318 | A1 | 8/2011 |

ARRANGEMENT FOR PLUG CONNECTING ELECTRICAL CONNECTIONS

CROSS-REFERENCE TO RELATED PATENT APPLICATIONS

This patent application is a United States national phase patent application based on PCT/KR2020/000229 filed on Jan. 7, 2020, which claims the benefit of German Patent Application No. 10 2019 100 611.2 filed on Jan. 11, 2019 and German Patent Application No. 10 2019 111 691.0 filed on May 6, 2019, the entire contents of all of which are hereby incorporated herein by reference.

TECHNICAL FIELD

The invention relates to an arrangement for plug connecting electrical connections through a housing, particularly a device for driving a compressor, such as an electric motor, especially for compressing a fluid in a vapor state, such as a refrigerant. The arrangement comprises a first plug connection having first plug connectors and a second plug connection having second plug connectors for transmitting electrical energy in independent transmitting ranges, particularly in different voltage ranges, and a receiving element for receiving plug connectors.

The invention further relates to a device for driving a compressor, particularly an electric motor, having the arrangement for plug connecting electrical connections, and to a method for assembling the arrangement to the device for driving the compressor. The compressor can be used in the refrigerant circuit of an air conditioning system of a motor vehicle.

BACKGROUND ART

Compressors known from the prior art for mobile applications, particularly for air conditioning systems of motor vehicles, for transporting refrigerant through a refrigerant circuit, also known as refrigerant compressors, are often implemented as piston compressor having variable stroke volume or as scroll compressors, regardless of the refrigerant. The compressors are thereby driven either by a belt pulley or electrically.

An electrically driven compressor comprises an inverter for driving the electric motor in addition to an electric motor for driving the corresponding compressing mechanism. The inverter serves for converting direct current of a vehicle battery into alternating current fed to the electric motor through electrical connections.

The inverter comprises plug connections for plug connectors implemented as pins for electrically connecting to connections of the electric motor, said connections in turn being electrically connected to connecting lines of wires of the coils of the stator. The connections of the electric motor are implemented in a plug housing disposed on an end face of the stator facing in the axial direction of the stator.

The plug connectors disposed on the inverter or on a circuit board of a switch device of the compressor and disposed outside of a housing of the compressor and implemented as pins are each plugged into connectors provided in a plug housing when the compressor is assembled, and each contacting an end piece connected to a corresponding wire, particularly a connecting line of the wire. The plug connectors leading through the housing to the inverter disposed outside of the housing must be hermetically sealed off in order to ensure that no refrigerant and/or oil flowing in the compressor reaches the environment and that no short circuits or damage occurs in the inverter, particularly to components disposed on the circuit board of the inverter.

Electrically driven compressors are conventionally each implemented having a plug connector for connections for transmitting electrical energy in the low-voltage range and a plug connector for connections for transmitting electrical energy in the high-voltage range, each connected to the housing by means of four screw connection and having two sealing elements. As a result, the two plug connections to be installed separately and ensuring the power supply are assembled by means of eight screws and four sealing elements, particularly two axial seals and two radial seals.

An electrically conductive connection implemented as an electric lock, also known as an interlock connection, is further provided between the two plug connections for internally communicating and controlling and is ensured by means of separate connections on the plug connectors. The at least two additional electrical lines of the interlock connection required for electrically connecting are run freely on the housing or on the circuit board subsequent to assembling the plug connectors and are connected to the circuit board and the plug connectors. An adhesive is used as a fastening means, for example, for the electrical lines on the housing or on the circuit board. Failure of the electrical lines could cause undesired noise. The lines, particularly the insulation of the lines, could also be destroyed. The two additional electrical lines further make it necessary to implement four additional electrical lines.

The plug connectors known from the prior art having a high number of components and thus requiring an extended installation space require extended installation time, as the potential installation space within the housing of the compressor and therefore the installation space for the electrical plug connectors are also very small and the interlock connection takes place only after the plug connections are installed in the housing. The plug connections implemented from the plurality of components further cause high material costs, production costs, and storage costs.

SUMMARY

The object of the invention is to provide an arrangement for plug connecting electrical connections for a device for driving an electrically driven compressor of a fluid in a vapor state, particularly of an electric motor, able to be installed in a simple and therefore time-saving manner. The complexity of the structure and the installation space of the arrangement in particular are to be minimized, and thus also the installation space required within the device. The arrangement is to comprise as few individual components as possible and be simple to implement in design, also in order to minimize the cost of production.

The object is achieved by the subject-matter having the features of the independent claims. Refinements are disclosed in the dependent claims.

The object is achieved by an arrangement according to the invention for plug connecting electrical connections through a housing, particularly a device for driving a compressor. The arrangement comprises a first plug connection having first plug connectors and a second plug connection having second plug connectors for transmitting electrical energy in independent transmitting ranges, particularly in different voltage ranges, and a receiving element for receiving plug connectors.

According to the invention, the receiving element having all the first plug connectors of the first plug connection and all of the second plug connectors of the second plug connection is implemented as an integral and cohesive unit and one-piece component.

According to a refinement of the invention, the plug connectors advantageously have the shape of a straight pin and are each disposed inside a feedthrough implemented in the receiving element. Each plug connector inside the feedthrough is preferably completely enclosed by the receiving element and hermetically sealingly connected to the receiving element.

The receiving element is preferably implemented as a cohesive unit and one-piece component having the feedthroughs of the plug connectors, particularly as a one-piece injection molded element.

According to an advantageous embodiment of the invention, the first plug connection comprises two first plug connectors while the second plug connection is implemented having three second plug connectors.

A further advantage of the invention is that the receiving element of the plug connections is implemented having a sealing element acting in a radial direction and completely enclosing the receiving element in a radial direction and having a sealing element acting in an axial direction and disposed between the housing and the receiving element. Hermetic sealing of the housing, particularly of the entire compressor, is ensured by means of the sealing elements in the region of the penetrations of the electrical connections.

The sealing element can be made of a duromer in order to ensure an electrically insulating and hermetically sealing connection at each of the sealing surfaces.

According to a preferred embodiment of the invention, the receiving element can be fixed to the housing. The receiving element preferably comprises feedthrough openings for receiving fasteners, particularly screws of screw connections. Each of the six fastener, for example, is thereby disposed passing through a feedthrough opening.

According to a refinement of the invention, the arrangement is implemented having an interlock connection configured as an electrical lock and conductively coupled to plug connectors of the plug connections. The interlock connection is advantageously fixed on the receiving element and can be disposed integrated within the receiving element, at least in regions, in the assembled state. The receiving element thereby preferably comprises formed elements corresponding to the outer shape of the interlock connection. The formed elements are implemented on a side of the receiving element aligned to the plug connectors and in a volume enclosed by the housing. The interlock connection can therefore be integrated, placed, and fixed within the formed elements implemented in the receiving element.

According to a further preferred embodiment of the invention, the interlock connection is made of busbars for electrically connecting each of the plug connectors. The busbars of the interlock connection, particularly disposed in pairs, are each advantageously U-shaped in design, wherein the legs of the U-shaped busbars are configured for electrically contacting each of the plug connectors.

The object is also achieved by a device according to the invention for driving a compressor of a fluid in the vapor state, particularly an electric motor. The device comprises a rotor and a stationary stator extending along a common longitudinal axis and a housing.

The stator is advantageously positioned at an outer side of the rotor in the radial direction and encloses the rotor.

According to the invention, the device is implemented having a connection arrangement for feeding electrical power to the stator by means of an arrangement of electrical connections for plug connecting through the housing, as described above according to the invention.

According to an advantageous embodiment of the invention, the connection arrangement is provided at a first end face of the stator aligned in an axial direction. The end face aligned in the axial direction is disposed in a plane perpendicular to the longitudinal axis. The axial direction is thereby understood to mean the direction of the longitudinal axis of the stator, also corresponding to the longitudinal axis and axis of rotation of the rotor.

The object is also achieved by a method according to the invention for assembling the arrangement for plug connecting electrical connections through a housing, particularly a device for driving a compressor of a fluid in the vapor state, particularly an electric motor. The method comprises the following steps:

inserting plug connectors of a first plug connection and a second plug connection into a receiving element implemented as a cohesive unit and one-piece component, and hermetically sealingly connecting the plug connector to the receiving element preassembling an interlock connection on the receiving element, wherein the interlock connection having the corresponding plug connectors is electrically conductively coupled to the corresponding plug connectors, and inserting the arrangement into the housing, wherein the receiving element is disposed contacting the housing and hermetically sealing off the housing by means of sealing elements.

According to a refinement of the invention, the interlock connection is placed and fixed in formed elements implemented in the receiving element, particularly clipped in.

According to a preferred embodiment of the invention, the arrangement for plug connecting electrical connections is inserted into the housing through a feedthrough opening implemented in the housing with the plug connectors aligned in an axial direction leading.

The free ends of the plug connectors disposed distal to the receiving element are preferably electrically connected to a circuit board.

A further advantage of the invention is that the arrangement is fixedly connected to the housing in the region of the receiving element, wherein fasteners are inserted into the housing through feedthrough openings implemented in the receiving element. The receiving element can be fixed on the housing by means of screw connections.

The advantageous embodiment of the invention enables the use of the device for driving a compressor, particularly an electric motor, for compressing a fluid in the vapor state for a compressor of a refrigerant in a refrigerant circuit of an air conditioning system of a motor vehicle.

A substantial advantage of the invention is that the arrangement for plug connecting electrical connections having the receiving element for the different plug connections and the interlock connection for integrating in the receiving element can be pre-assembled as a cohesive unit and one-piece multiport connection including variable interlock connection, and thus as an integrally implemented plug connector. A multifunctional component is thus implemented.

The arrangement according to the invention and the device according to the invention for driving a compressor of a fluid in the vapor state having the arrangement comprise further diverse advantages, in summary:

minimal number of components, as the use of the receiving element for both plug connections eliminates sealing elements and fasteners in comparison with arrangements from the prior art, for example, and the interlock connection can be added or removed as needed simply by snapping in or out, therefore minimal installation space, particularly within the housing, simple assembly of the arrangement, particularly when inserting into the housing, as the potential interlock connection in particular can already be preassembled and part of the arrangement, and therefore minimal cost with respect to assembly time, material costs, and production costs.

BRIEF DESCRIPTION OF DRAWINGS

Further details, features, and advantages of embodiments of the invention are evident from the following description of embodiment examples with reference to the associated drawings. In the drawings.

DETAILED DESCRIPTION OF AN EMBODIMENT

Figure 1:
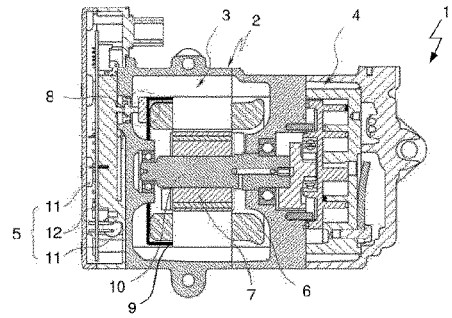
FIG. 1: a section view of an electrically driven compressor having an electric motor as a device for driving a compressing mechanism.

FIG. 1 depicts a section view of an electrically driven compressor 1 having an electric motor 3 disposed in a housing 2 as a device for driving a compressing mechanism 4. The electric motor 3 is supplied with power by means of a switch device 5.

The electric motor 3 comprises a stator 6 having a substantially hollow cylindrical stator core and windings wound on the stator core, and a rotor 7 disposed within the stator 6. The rotor 7 is induced to a rotary motion when the coils of the stator 6 are supplied with electrical power by means of a connection arrangement 8. The connection arrangement 8 is implemented at an end face of the stator 6 and comprises a plurality of electrical connections.

A support element 9 for holding connections having components of electrical connections between the coils of the electric motor 3 and the switch device 5 is disposed on the end face of the stator 1 having the connection arrangement 8. The connections are implemented having electrically conductive, pin-shaped plug connectors for electrically conductively connecting connection lines of the coils to elements of the switch device 5.

The rotor 7 is disposed coaxially within the stator 6 and rotatable about an axis of rotation. A drive shaft 10 can be implemented as integral to the rotor 7 or as a separate element.

The electric motor 3 and the compressing mechanism 4 implemented as a scroll compressor having a stationary and an orbiting spiral are disposed within a volume enclosed by the housing 2. The housing 2 is thereby implemented as a first housing element for receiving the electric motor 3 and a second housing element for receiving the compressing mechanism 4 and preferably made of a metal, particularly of aluminum.

The orbiting spiral of the compressing mechanism 4 in which the fluid in the vapor state, particularly a refrigerant, is compressed is driven by the drive shaft 10 connected to the rotor 7 of the electric motor 3. According to an embodiment, not shown, the compressing mechanism can also be implemented having a swashplate.

The switch device 5 for controlling the operation of the electric motor 3 comprises a circuit board 12 implemented having various circuit elements 11 and sockets. Various actuating circuits and components are mounted in an electrically connected manner on the circuit board 12 and are supplied with electrical power from a power line of an external power source. The sockets serve particularly for receiving plug connectors as an electrical connection between the plug connectors and the circuit board.

Figure 2:
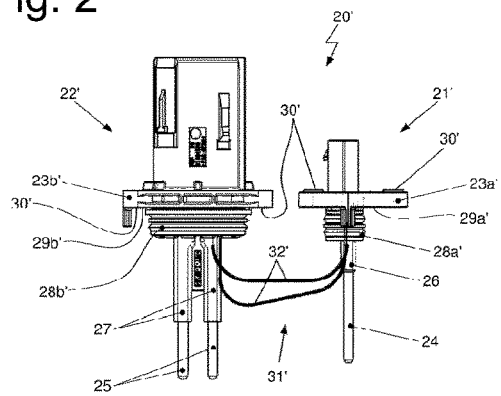
FIG. 2: a side view of an arrangement for plug connecting electrical connections of an electric motor as a device for driving a compressor of a fluid in the vapor state having separately implemented plug connectors from the prior art.
Figure 3:
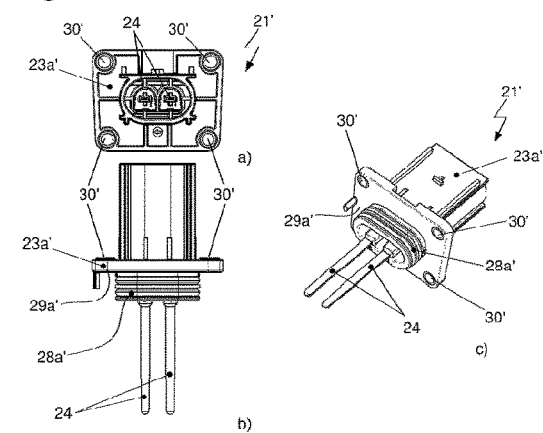
FIG. 3: a side view, plan view, and perspective view of a first plug connection of the arrangement for plug connecting from FIG. 2, FIG. 4: a side view, plan view, and perspective view of a second plug connection of the arrangement for plug connecting from FIG. 2, FIGS. 5A to 5E: a side view, plan view, perspective view, and perspective exploded view of an arrangement according to the invention for plug connecting.
Figure 4:
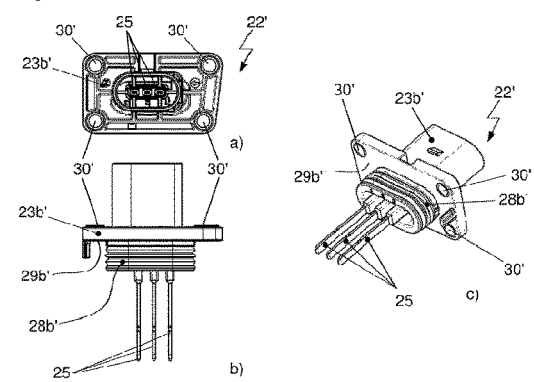
Figure 5A:
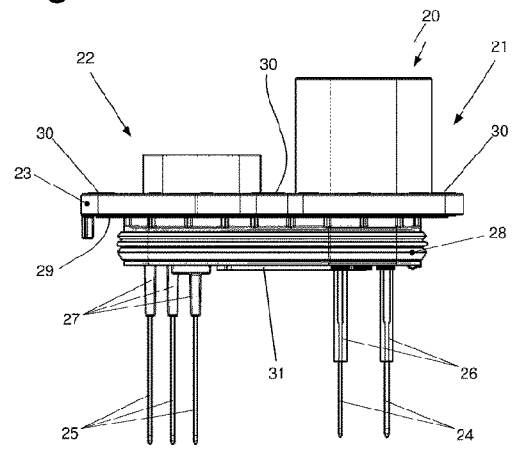
Figure 5B:
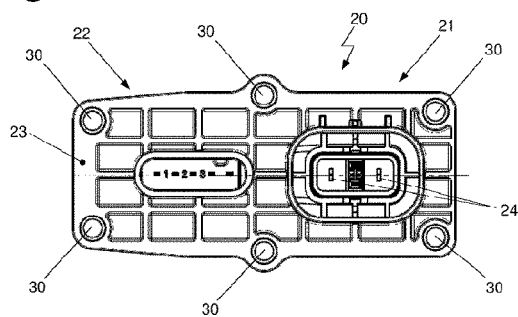
Figure 5C:
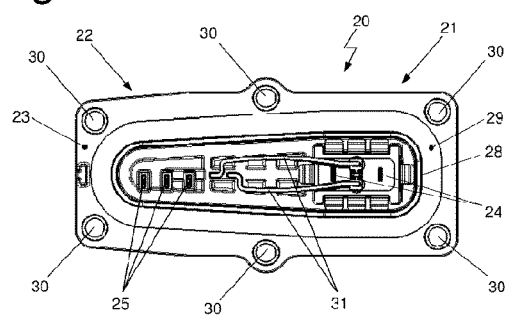
Figure 5D:
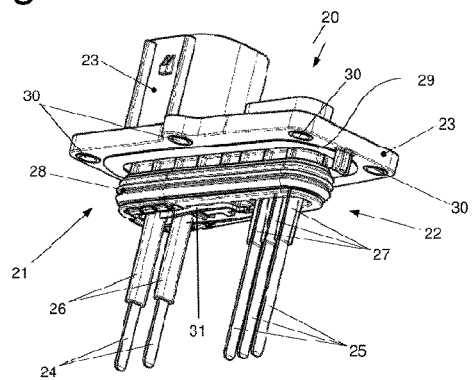
Figure 5E:
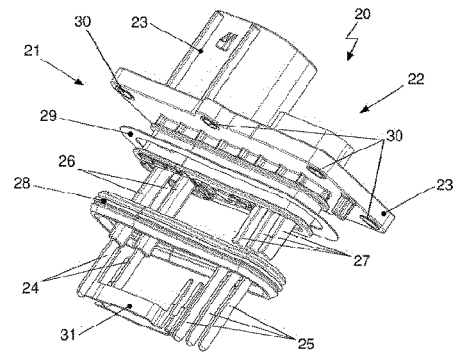

FIG. 2 shows a side view of an arrangement 20' for plug connecting an electric motor as a device for driving a compressor of a fluid in the vapor state having separately implemented and therefore separate from each other plug connectors 21', 22' from the prior art. FIG. 3 thereby depicts a side view, a plan view, and a perspective view of a first plug connection 21' of the arrangement 20' for plug connecting from FIG. 2, whereas FIG. 4 depicts a side view, a plan view, and a perspective view as well of a second plug connection 22' of the arrangement 20' for plug connecting from FIG. 2.

The arrangement 20' for plug connecting the electrical connections of the electric motor is implemented having the first plug connection 21' for connections for transmitting electrical power in a low-voltage range and the second plug connection 22' for connections for transmitting electrical power in a high-voltage range.

Each plug connection 21', 22' comprises a receiving element 23a', 23b' for receiving plug connectors 24, 25, wherein the first plug connection 21' has a first receiving element 23a' for receiving first plug connectors 24 for transmitting electrical power in the low-voltage range and the second plug connection 22' has a second receiving element 23b' for receiving second plug connectors 25 for transmitting electrical power in the high-voltage range. The plug connectors 24, 25 are each inserted into the receiving element 23a', 23b' inside a feedthrough 26, 27 and disposed passing through the receiving element 23a', 23b'.

Each receiving element 23a', 23b' of the plug connections 21', 22' is further implemented having a first sealing element 28a', 28b' acting in the radial direction and a second sealing element 29a', 29b' acting in the axial direction and ensuring hermetic sealing of regions of the compressor exposed to refrigerant.

The receiving elements 23a', 23b' are each connected to the housing by means of four fasteners, such as screws. Each screw is thereby disposed passing through a feedthrough opening 30' implemented in the receiving element 23a', 23b'.

The arrangement 20' thereby comprises the two separately assembled plug connectors 21', 22' implemented overall having at least eight fasteners, particularly screws, and four sealing elements 28a', 28b', 29a', 29b', particularly two first sealing elements 28a', 28b' acting in the radial direction and two second sealing elements 29a', 2b' acting in the axial direction and thus having a plurality of components.

The radial and axial directions indicated are relative to the alignment of the plug connectors 24, 25 aligned substantially parallel to each other in the longitudinal direction in each case. The longitudinal direction of the plug connectors 24, 25 thereby also corresponds to the axial direction of the plug connectors 21', 22'. The radial direction is orthogonal to the longitudinal direction of the plug connector 24, 25 in each case, and thus aligned to the axial direction of the plug connectors 21', 22'.

An interlock connection 31' implemented as an electrical lock is further implemented between the first plug connection 21' and the second plug connection 22' for controlling the transmitting of electrical power in the low-voltage range and in the high-voltage range. The interlock connection 31' comprises at least two electrically conductive connecting lines 32' electrically conductively coupled at the ends thereof to the plug connections 21', 22' by means of separate connections.

The interlock connection 31' as a power line connection particularly enables switching off the high-voltage range whenever an electrical connection within the high-voltage range is unintentionally interrupted. The interlock connection 31' thus fulfills a safety-related function of the arrangement 20' by means of early interruption of the power circuit.

After the plug connectors 21', 22' have been assembled, the connecting lines 32' of the interlock connection 31 are routed freely and each electrically connected to the ends of the line connectors by means of the plug connections 21', 22'. The connecting lines 32' are further fixed on the housing or on the circuit board by means of a fastening means, particularly an adhesive.

The arrangement 20' having the plug connections 21', 22' and a high number of components having complex structures require both a large installation space and a long installation time.

FIGS. 5A to 5E show a side view, plan views, perspective view, and perspective exploded view of an arrangement 20 according to the invention for plug connecting.

The arrangement 20 is implemented as an integral component combining in one common receiving element 23 the first plug connection 21 for transmitting electrical power in the low-voltage range and the second plug connection 22 for transmitting electrical power in the high-voltage range. The first plug connection 21 and the second plug connection 22 thereby comprise a common receiving element 23 for receiving the first plug connector 24 and the second plug connector 25.

The plug connectors 24, 25 each having the shape of a straight pin are each inserted into the receiving element 23 inside a feedthrough 26, 27 and disposed passing through the receiving element 23. Each plug connector 24, 25 is thereby completely enclosed by a feedthrough 26, 27 within the receiving element 23 of the arrangement 20 and thus disposed hermetically sealed relative to the receiving element 23. Each feedthrough 26, 27 represents one component or a region of the receiving element 23. The receiving element 23 is thereby preferably implemented as a cohesive unit and one-piece component having the feedthroughs 26, 27, particularly as a one-piece injection molded element. The one-piece implementation is achieved within a forming process.

The receiving element 23 of the plug connections 21, 22 is further implemented having a first sealing element 28 acting in the radial direction and a second sealing element 29 acting in the axial direction and ensuring hermetic sealing of regions of the compressor exposed to refrigerant. In addition to the plug connectors 24, 25 disposed within the feedthroughs 26, 27 and fed through the housing toward the outside to the inverter or the circuit board, the receiving element 23 itself is hermetically sealed with respect to the housing in order to ensure that refrigerant and/or oil flowing in the compressor does not escape to the environment and cause short circuits or damage in the inverter, particularly to the components disposed on the circuit board of the inverter. The sealing elements 28, 29 are preferably each made of a duromer.

The receiving element 23 is connected to the housing by means of six fasteners, such as screws of screw connections. Each fastener, that is, each screw is thereby disposed passing through a feedthrough opening 30 implemented in the receiving element 23.

The arrangement 20 according to the invention thus comprises a receiving element 23 having the two plug connections 21, 22 and having a maximum of six fasteners, particularly screws, and two sealing elements 28, 29, particularly a first sealing element 28 acting in the radial direction and a second sealing element 29 acting in the axial direction, and thus is implemented having a minimal number of components.

An interlock connection 31 implemented as an electrical lock between the first plug connection 21 and the second plug connection for controlling the transmitting of electrical power in the low-voltage range and in the high-voltage range comprises busbars. The busbars disposed in pairs and each implemented having a U-shape are disposed within the receiving element 23 in the assembled state. The legs of the U-shaped busbars are thereby configured for electrically contacting each of the plug connectors 24, 25. The busbars of the interlock connection 31 are preferably implemented as stamped and formed sheet metal components.

The receiving element 23 comprises formed elements corresponding to the shapes of the busbars on a side aligned to the plug connectors 24, 25 and thus in the volume enclosed by the housing. The individual busbars of the interlock connection 31 can thus each be integrated within the formed elements implemented in the receiving element 23. The busbars are placed and fixed in the formed elements of the receiving element 23.

By placing the busbars in the formed elements of the receiving element 23, particularly by clipping in the desired position, the busbars are brought into electrical contact with the corresponding plug connectors 24, 25 and electrically conductive connections are simultaneously produced between the corresponding plug connectors 24, 25 and the plug connections 21, 22 are electrically conductively coupled.

The busbars of the interlock connection 31 are preassembled within the receiving element 23. The arrangement 20 is then inserted into the housing of the compressor.

Figure 6A:
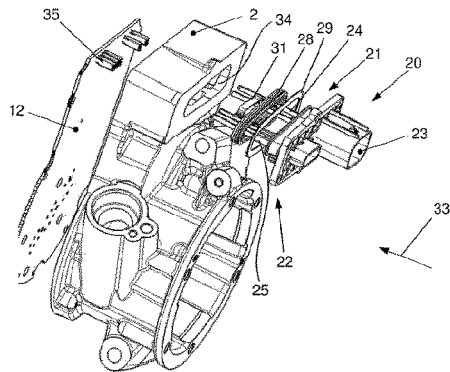
FIG. 6A: a perspective exploded view of the arrangement for plug connecting from FIGS. 5A to 5E in combination with the housing of the compressor and a circuit board.

FIG. 6A shows a perspective exploded view of the arrangement 20 according to the invention for plug connecting in combination with the housing 2 of the compressor and the circuit board 12.

The arrangement 2 combining the first plug connection 21 for transmitting electrical power in the low-voltage range and the second plug connection 22 for transmitting electrical power in the high-voltage range in one common receiving element is inserted into the housing 2 during assembly, having the plug connectors 24, 25 disposed aligned in the axial direction leading in the direction of motion 33. The arrangement 20 having the sealing elements 28, 29 and the preassembled busbars of the interlock connection 31 is thereby passed through a feedthrough opening 34 implemented in the housing 2 with the plug connectors 24, 25 leading. Sockets 35 for receiving the plug connectors 24, 25 are provided on the circuit board 12.

In the assembled state, the first sealing element 28 makes contact in the radial direction within the feedthrough opening 34 between the receiving element 23 and the housing 2, whereas the second sealing element 29 is disposed completely about the feedthrough opening 34 between the receiving element 23 and the housing 2 in the axial direction of motion 33. The arrangement of the sealing elements 28, 29 on the housing 2 is particularly evident from FIG. 6B, showing a detail perspective view of the housing 2 of the compressor having the feedthrough opening 34 for installing the arrangement 20 for plug connecting.

Figure 6B:
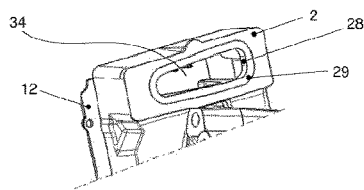
FIG. 6B: a detail perspective view of the housing of the compressor having a feedthrough opening for installing the arrangement for plug connecting.
Figure 6C:
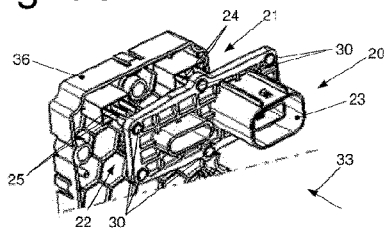
FIG. 6C: a perspective view of the arrangement for plug connecting in combination with a guide element disposed within the housing.

During assembly of the arrangement 20 within the feedthrough opening 34, the plug connectors 24, 25 are passed through a guide element 36 disposed within the housing 2 according to FIGS. 6B and 6C depict a perspective view of the arrangement 20 for plug connecting in combination with the guide element 36. The guide element 36 is configured in the form of individual funnels guiding the plug connectors 24, 25 into the sockets 35 provided on the circuit board 12 when inserting, each having a clear cross section of about 2.8 mm×0.8 mm, thus facilitating assembly of the arrangement 20.

Figure 6D:
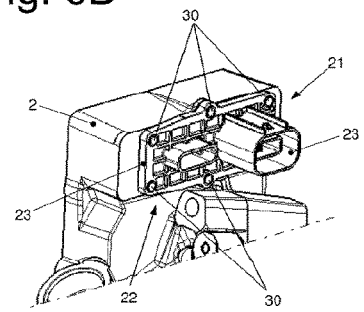
FIG. 6D: a perspective view of the arrangement for plug connecting in the state of having been inserted into the housing.

The arrangement 20 is inserted into the housing 2 into the feedthrough opening 34 until the receiving element 23 makes contact with the housing 2, particularly with the second sealing element 29 disposed between the housing 2 and the receiving element 23, as can be seen in FIG. 6D as well. In the state shown in FIG. 6D showing a perspective view of the arrangement 20 for plug connecting in the state inserted into the housing 2, the arrangement 20 is fixedly connected to the housing 2 in the region of the receiving element 23. Fasteners, such as screws of screw connections, are thereby particularly inserted through the feedthrough openings 30 implemented in the receiving element 23 into the housing 2 and connected by forming screw connections. The arrangement 20 is thereby fixedly connected to the housing 2 in the region of the receiving element 23. The housing 2 is also hermetically sealed off by means of the sealing elements 28, 29 due to the implementation of the arrangement 20.

Figure 6E:
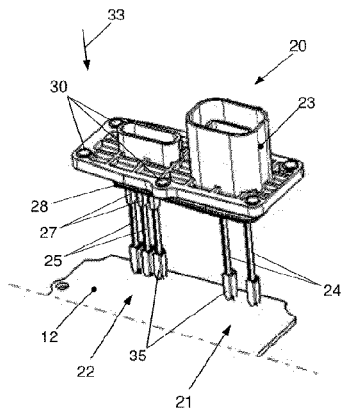
FIGS. 6E and 6F: a perspective view and side view of the arrangement for plug connecting in combination with the circuit board.
Figure 6F:
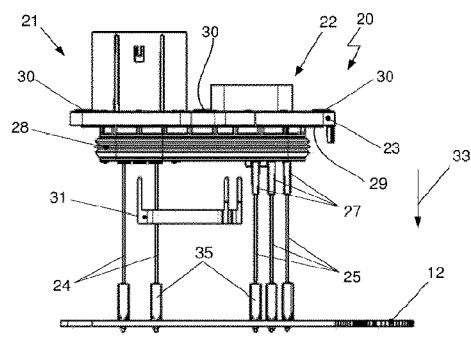
Figure 6G:
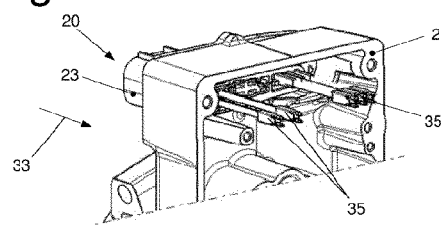
FIGS. 6G and 6H: a perspective view of the arrangement for plug connecting in the state of having been inserted into the housing, with and without the circuit board.
Figure 6H:
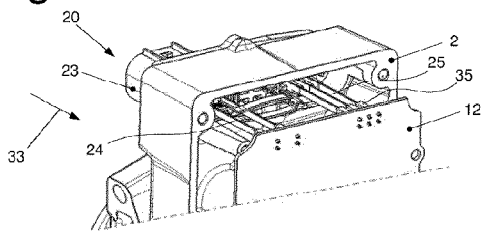

During assembly of the arrangement 20, the plug connectors 24, 25 are inserted into the sockets 35 provided on the circuit board 12 according to FIG. 6A and FIGS. 6E to 6H having the free ends thereof disposed distally to the receiving element 23 in the direction of motion 33, and thus produce electrical connections of the plug connector 24, 25 and the circuit board 12 or a component disposed on the circuit board 12. A perspective view and a side view of the arrangement 20 for plug connecting in combination with the circuit board 12 is depicted in FIGS. 6E and 6F, while FIGS. 6G and 6H show a perspective view of the arrangement 20 in the state inserted into the housing 2, with and without the circuit board 12.

Each socket 35 is implemented having a hollow cylindrical wall extending in an axial direction or in the direction of motion 33 and protruding from the circuit board 12 for receiving a plug connector 24, 25. The wall of each socket 35 is thus implemented having an end face facing toward the receiving element 23 in the axial direction for receiving a plug connector 24, 25.

REFERENCE LIST 1 compressor
2 housing
3 electric motor
4 compressing mechanism
5 switch device
6 stator having stator core
7 rotor
8 connection arrangement
9 support element
10 drive shaft
11 switching element
12 circuit board
20, 20' arrangement
21, 21' first low-voltage plug connection
22, 22' second high-voltage plug connection
23 receiving element for plug connections 21, 22
23a' first receiving element for first plug connection 21'
23b' second receiving element for second plug connection 22'
24 first plug connector for first plug connection 21, 21'
25 second plug connector for second plug connection 22, 22'
26 feedthrough for first plug connector 24
27 feedthrough for second plug connector 25
28 first sealing element for receiving element for plug connectors 21,
28a' first sealing element for first receiving element 23a'
28b' first sealing element for second receiving element 23b'
29 second sealing element for receiving element for plug connectors 21, 22
29a' second sealing element for first receiving element 23a'
29b' second sealing element for second receiving element 23b'
30, 30' feedthrough opening for fastener
31, 31' interlock connection
32' connecting line
33 direction of motion
34 feedthrough opening in housing 2
35 socket
36 guide element

The invention claimed is:

1. An arrangement for plug connecting electrical connections through a housing, the arrangement comprising:
a first plug connection having first plug connectors;
a second plug connection having second plug connectors for transmitting electrical energy in independent transmitting ranges; and
a receiving element for receiving the first plug connector and the second plug connectors, wherein the receiving element having the first plug connectors of the first plug connection and the second plug connectors of the second plug connection is implemented as an integral and cohesive unit and one-piece component, wherein the receiving element of the first plug connection and the second plug connection has a sealing element acting in a radial direction and fully enclosing the receiving element in a radial direction and disposed between the housing and the receiving element.

2. The arrangement according to claim 1, wherein the first plug connectors and the second plug connectors are each a straight pin.

3. The arrangement according to claim 1, wherein the first plug connectors and the second plug connectors are each disposed within a feedthrough implemented in the receiving element.

4. The arrangement according to claim 3, wherein each of the first plug connectors and the second plug connectors within the feedthrough is entirely enclosed by the receiving element and is hermetically sealed to the receiving element.

5. The arrangement according to claim 3, wherein the receiving element is a cohesive unit and one-piece component having the feedthroughs.

6. The arrangement according to claim 1, wherein the first plug connection has two of the first plug connectors.

7. The arrangement according to claim 1, wherein that the second plug connection has three of the second plug connectors.

8. An arrangement for plug connecting electrical connections through a housing, the arrangement comprising:
a first plug connection having first plug connectors;
a second plug connection having second plug connectors for transmitting electrical energy in independent transmitting ranges; and
a receiving element for receiving the first plug connector and the second plug connectors, wherein the receiving element having the first plug connectors of the first plug connection and the second plug connectors of the second plug connection is implemented as an integral and cohesive unit and one-piece component, wherein the receiving element of the first plug connection and the second plug connection has a sealing element acting in an axial direction and disposed between the housing and the receiving element.

9. The arrangement according to claim 1, wherein the receiving element can be fixed to the housing.

10. The arrangement according to claim 9, wherein the receiving element further comprises feedthrough openings for receiving fasteners, wherein each of the fasteners passes through one of the feedthrough opening.

11. The arrangement according to claim 1, wherein an interlock connection configured as an electrical lock is implemented and electrically conductively connected to the first plug connectors and the second plug connectors of the first plug connection and the second plug connection.

12. The arrangement according to claim 11, wherein the interlock connection is fixed to the receiving element.

13. The arrangement according to claim 11, wherein the interlock connection is integrated within the receiving element at least in some areas in an assembled state.

14. The arrangement according to claim 11, wherein the receiving element further comprises formed elements corresponding to an outer shape of the interlock connection.

15. The arrangement according to claim 14 wherein the formed elements are implemented on a side of the receiving element aligned to the first plug connectors and the second plug connectors and in a volume enclosed by the housing.

16. The arrangement according to claim 11, wherein the interlock connection is formed from busbars for electrically connecting each of the first plug connectors and the second plug connectors.

17. The arrangement according to claim 16, wherein the busbars of the interlock connection are disposed in pairs.

18. An arrangement for plug connecting electrical connections through a housing, the arrangement comprising:
a first plug connection having first plug connectors;
a second plug connection having second plug connectors for transmitting electrical energy in independent transmitting ranges; and
a receiving element for receiving the first plug connector and the second plug connectors, wherein the receiving element having the first plug connectors of the first plug connection and the second plug connectors of the second plug connection is implemented as an integral and cohesive unit and one-piece component, wherein an interlock connection configured as an electrical lock is implemented and electrically conductively connected to the first plug connectors and the second plug connectors of the first plug connection and the second plug connection, wherein the interlock connection is formed from busbars for electrically connecting each of the first plug connectors and the second plug connectors, wherein the busbars of the interlock connection are each implemented having a U shape, wherein legs of the busbars implemented in a U shape are configured for electrically contacting each of the first plug connectors and the second plug connectors.

19. A device for driving a compressor of a fluid in a vapor state, the device comprising the housing and a stator and a rotor disposed extending along a common longitudinal axis, wherein a connection arrangement is implemented for feeding in electrical energy to the stator having the arrangement for plug connecting electrical connections through the housing according to claim 1.

20. The device according to claim 19, wherein the connection arrangement is implemented at a first end face of the stator facing in an axial direction.

21. A method for assembling the arrangement for plug connecting electrical connections through the housing according to claim 19, the method comprising steps of:
inserting the first plug connectors and the second plug connectors of the first plug connection and the second plug connection into the receiving element implemented as a cohesive unit and one-piece component, and hermetically sealingly connecting the first plug connectors and the second plug connectors to the receiving element,
preassembling an interlock connection on the receiving element, wherein the interlock connection is electrically conductively coupled to the first plug connectors and the second plug connectors; and
inserting the arrangement into the housing, wherein the receiving element is disposed contacting the housing and hermetically sealing off the housing by means of sealing elements.

22. The method according to claim 21, wherein the interlock connection is placed in formed elements implemented in the receiving element and fixed in place.

23. The method according to claim 21, wherein the arrangement is inserted into the housing through a feedthrough opening implemented in the housing with the first plug connectors and the second plug connectors aligned in an axial direction leading.

24. The method according to claim 21, wherein free ends of the first plug connectors and the second plug connectors disposed distal to the receiving element are electrically connected to a circuit board.

25. The method according to any one of the claim 21, wherein the arrangement is fixedly connected to the housing in a region of the receiving element, wherein fasteners are inserted into the housing through feedthrough openings implemented in the receiving element.

* * * * *